United States Patent [19]

Takekoshi

[11] 4,293,684

[45] Oct. 6, 1981

[54] POLYETHERIMIDE HAVING LONG CHAIN ALIPHATIC END GROUPS AND METHOD FOR MAKING

[75] Inventor: Tohru Takekoshi, Scotia, N.Y.

[73] Assignee: General Electric Company, Schenectady, N.Y.

[21] Appl. No.: 134,071

[22] Filed: Mar. 26, 1980

[51] Int. Cl.$^3$ .............................................. C08G 73/10
[52] U.S. Cl. ...................................... 528/185; 528/26; 528/125; 528/126; 528/128; 528/170; 528/172; 528/179; 528/180; 528/181; 528/182; 528/188
[58] Field of Search ............... 528/179, 180, 181, 182, 528/185, 26, 188, 125, 126, 128, 170, 172

[56] References Cited

U.S. PATENT DOCUMENTS

| | | | |
|---|---|---|---|
| 3,803,085 | 4/1974 | Takekoshi et al. | 260/37 N X |
| 3,847,867 | 11/1974 | Heath et al. | 260/37 N X |
| 3,905,942 | 9/1975 | Takekoshi et al. | 528/185 |
| 3,983,093 | 9/1976 | Williams et al. | 260/37 N X |
| 3,989,670 | 11/1976 | Takekoshi et al. | 528/208 |
| 4,197,396 | 4/1980 | Banucci et al. | 528/185 X |
| 4,221,897 | 9/1980 | Takekoshi | 528/185 X |

*Primary Examiner*—Howard E. Schain
*Attorney, Agent, or Firm*—William A. Teoli; James C. Davis, Jr.

[57] ABSTRACT

Polyetherimides having long chain aliphatic end groups have been found to exhibit significantly lower melt viscosities and higher notched izod impact values compared to comparable polyetherimides end capped with organic radicals derived from aromatic organic amines or aromatic organic anhydrides.

10 Claims, No Drawings

POLYETHERIMIDE HAVING LONG CHAIN ALIPHATIC END GROUPS AND METHOD FOR MAKING

CROSS REFERENCE TO RELATED APPLICATIONS

Reference is made to my copending application Ser. No. 37,438, filed May 9, 1979, now abandoned, for Injection Moldable Polyetherimide Oligomers and Ser. No. 37,437, now abandoned, filed May 9, 1979, for Particulated Polyetherimide and Method for Making of Eugene G. Banucci et al, where both applications are assigned to the same assignee as the present invention.

BACKGROUND OF THE INVENTION

The present invention relates to a method for improving the melt viscosity of polyetherimides by incorporating long chain alkylamine chain-stoppers during the melt polymerization of aromatic bis(ether anhydride) and aromatic diamine used in the production of such polyetherimides, or during the formation of polyetherimide prepolymers.

Prior to the present invention, as shown by copending application Ser. No. 37,438, filed May 9, 1979 and assigned to the same assignee as the present invention, injection moldable polyetherimide oligomers were made by effection reaction between substantially equal molar amounts of organic dianhydride of the formula,

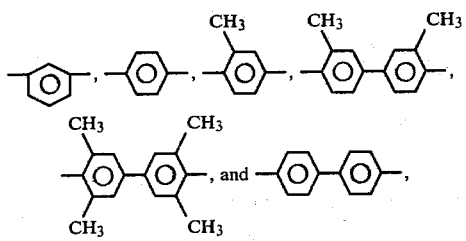

and organic diamine of the formula, $$H_2N-R-NH_2, \qquad (2)$$

under interfacial polymerization conditions, where Z is a member selected from

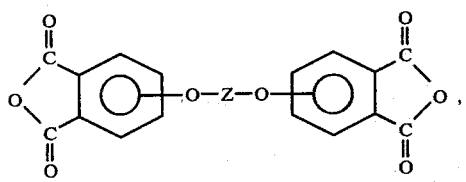

and divalent organic radicals of the general formula,

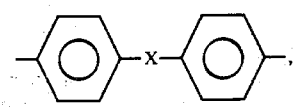

where X is a member selected from the class consisting of divalent radicals of the formulas,

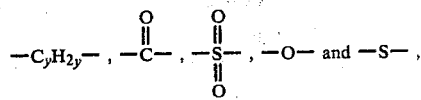

where y is an integer from 1 to 5, and R is a divalent organic radical selected from the class consisting of aromatic hydrocarbon radicals having from 6 to about 20 carbon atoms and halogenated derivatives thereof, alkylene radicals having from 2 to about 20 carbon atoms, cycloalkylene radicals having from 3 to about 20 carbon atoms, from $C_2$ to about $C_8$ alkylene terminated polydiorganosiloxane and divalent radicals of the formula,

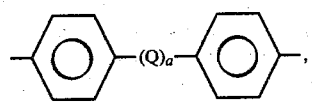

where Q is a member selected from $-O-$, $-S-$, $-SO_2-$, $-CO-$, and $-C_xH_{2x}-$, x is an integer from 1 to 5 and a is 0 or 1.

Although the above described polyetherimides consisting essentially of chemically combined units of the formula,

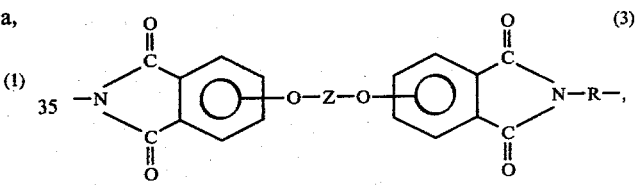

where R and Z are as previously defined, can be used as high performance injection moldable thermoplastics, the zero shear viscosity of the resulting thermoplastic can be $15.8 \times 10^5$ poise at 300° C. Even though the aforementioned thermoplastic materials have valuable injection moldable characteristics, those skilled in the art know that the aforementioned zero shear viscosity is undesirably high for particular applications. In addition, the resulting molded parts are often found to adhere to the surfaces of the mold resulting in complications in fabrication. In addition, the surface characteristics of the polyetherimide often did not satisfy the requirements of the fabricator in instances where a glossy appearance was required. The present invention is based on the discovery that polyetherimides, consisting essentially of units of formula 3 having a significant reduction in melt viscosity during melt polymerization and improved mold release and surface characteristics can be made by utilizing an effective amount of a long chain aliphatic hydrocarbon alkyl amine of the formula, $$R^1-NH_2, \qquad (4)$$

where $R^1$ is a aliphatic radical having from 12-20 carbon atoms, during the melt polymerization of substantially equal molar amounts of the organic dianhydride of formula (1) and organic diamine of formula (2).

STATEMENT OF THE INVENTION

There is provided by the present invention polyetherimides consisting essentially of chemically combined units of the formula,

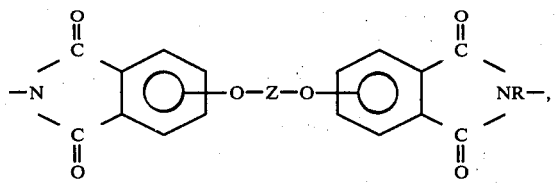

and terminal radicals of the formula,

—R¹, where Z, R and R¹ are as previously defined.

There is further provided by the present invention a method for making polyetherimide consisting essentially of chemically combined units of formula (3) which effects a substantial reduction in the melt viscosity of the resulting polyetherimide and improves its mold release properties which comprises melt polymerizing substantially equal molar amounts of organic dianhydride of formula (1) and organic diamine of formula (2) or prepolymer obtained therefrom in the presence of an effective amount of aliphatic organic amine of formula (4).

Among the aromatic bis(ether anhydride)s of formula (1) there are included
2,2-bis[4-(3,4-dicarboxyphenoxy)phenyl]propane dianhydride;
4,4'-bis(3,4-dicarboxyphenoxy)diphenyl ether dianhydride;
4,4'-bis(3,4-dicarboxyphenoxy)diphenyl sulfide dianhydride;
4,4'-bis(3,4-dicarboxyphenoxy)benzophenone dianhydride;
4,4'-bis(3,4-dicarboxyphenoxy)diphenyl sulfone dianhydride;
2,2-bis[4-(2,3-dicarboxyphenoxy)phenyl]propane dianhydride;
4,4'-bis(2,3-dicarboxyphenoxy)diphenyl ether dianhydride;
4,4'-bis(2,3-dicarboxyphenoxy)diphenyl sulfide dianhydride;
4,4'-bis(2,3-dicarboxyphenoxy)benzophenone dianhydride;
4,4'-bis(2,3-dicarboxyphenoxy)diphenyl sulfone dianhydride;
4-(2,3-dicarboxyphenoxy)-4'-(3,4-dicarboxyphenoxy)-diphenyl-2,2-propane dianhydride,
and mixtures thereof.

Aromatic bis(ether anhydride)s especially preferred herein are 2,2-bis[4-(3,4-dicarboxyphenoxy)phenyl]propane dianhydride, 2,2-bis[4-(2,3-dicarboxyphenoxy)phenyl]propane dianhydride; 4-(2,3-dicarboxyphenoxy)-4'-(3,4-dicarboxyphenoxy)diphenyl-2,2-propane dianhydride; and mixtures thereof.

Some of the aromatic bis(ether anhydride)s of formula (1) are shown in U.S. Pat. No. 3,972,902 (Darrell Heath and Joseph Wirth). As described therein, the bis(ether anhydride)s can be prepared from the hydrolysis, followed by dehydration of the reaction product of a nitro-substituted phenyl dinitrile with a metal salt of a dihydric phenol compound in the presence of a dipolar aprotic solvent.

Additional aromatic bis(ether anhydride)s also included by formula (1) are shown by Koton, M. M. Florinski, F. S. Bessonov, M. I. Rudakov, A. P. (Institute of Heteroorganic Compounds, Academy of Sciences, (U.S.S.R.) 257,010, November 11, 1969, Appl. May 3, 1967, and by M. M. Koton, F. S. Florinski, Zh. Org. Khin. 4 (5), 774 (1968).

There are included within formula (3), organic diamines such as
o-phenylenediamine;
m-phenylenediamine;
p-phenylenediamine;
4,4'-diaminodiphenylpropane;
4,4'-diaminodiphenylmethane (commonly named 4,4'methylenedianiline);
4,4'-diaminodiphenylsulfide (commonly named 4,4'thiodianiline);
4,4'-diaminodiphenyl ether (commonly named 4,4'oxydianiline);
1,5-diaminonaphthalene;
3,3'-dimethylbenzidine;
3,3'-dimethoxybenzidine;
2,4-bis(β-amino-t-butyl)toluene;
bis(p-β-amino-t-butyl)ether;
bis(p-β-methyl-o-aminopentyl)benzene;
1,3-diamino-4-isopropylbenzene;
1,2-bis(3-aminopropoxy)ethane;
benzidine;
m-xylylenediamine;
p-xylylenediamine;
2,4-diaminotoluene;
2,6-diaminotoluene;
bis(4-aminocyclohexyl)methane;
3-methylheptamethylenediamine;
4,4-dimethylheptamethylenediamine;
2,11-dodecanediamine;
2,2-dimethylpropylenediamine;
octamethylenediamine;
3-methoxyhexamethylenediamine;
2,5-dimethylhexamethylenediamine;
2,5-dimethylheptamethylenediamine;
3-methylheptamethylenediamine;
5-methylnonamethylenediamine;
1,4-cyclohexanediamine;
1,12-octadecanediamine;
bis(3-aminopropyl)sulfide;
N-methyl-bis(3-aminopropyl)amine;
hexamethylenediamine;
heptamethylenediamine;
nonamethylenediamine;
decamethylenediamine;
bis(3-aminopropyl)tetramethyldisiloxane;
bis(4-aminobutyl)tetramethyldisiloxane;
and mixtures of such diamines.

Organic diamines preferred herein are 4,4'-methylenedianiline, 4,4'-oxydianiline, metaphenylenediamine, paraphenylenediamine, and mixtures thereof.

In the practice of the invention the long chain alkyl amine chain-stopper, hereinafter referred to as "chain stopper", for example dodecylamine, cetyl amine, octadecylamine, etc., can be incorporated into the resulting polyetherimide during melt polymerization or as part of the prepolymer prior to melt polymerization. In one procedure, for example, the organic dianhydride and organic diamine can be melt polymerized in the presence of the chain-stopper. In another procedure the chain-stopper can be incorporated into the prepolymer chain ends prior to melt polymerization. In a further procedure the chain-stopper can be added to the prepolymer prior to melt polymerization.

Experience has shown that during melt polymerization of the organic dianhydride and organic diamine, or in the formation of the prepolymer, substantially equal molar amounts of organic dianhydride and organic diamine will provide for effective results. However, higher or lower amounts of the aforementioned ingredients can vary in particular situations. It has been found that significant improvement in both a reduction in melt viscosity at injection molding temperatures of about 300° C. and mold release properties can be achieved in the polyetherimide to provide 0.5 to 10 mole percent of the chain-stopper, based on the total moles of organic dianhydride, and organic diamine used in the melt polymerization mixture.

Melt polymerization of the various ingredients, for example, the organic dianhydride of formula (1), organic diamine of formula (2) and chain-stopper of formula (4) can be achieved at temperatures in the range of from 200° C. to 400° C., while a preferred temperature range is about 250° C. to 350° C.

In instances where the polyetherimide consisting essentially of formula (3) units is prepared from prepolymer, the prepolymer can be prepared by contacting the organic dianhydride of formula (1) and organic diamine of formula (2) under conditions of high agitation in the presence of water and organic solvent to produce an oligomer. As previously indicated, the chain-stopper can be introduced during the formation of the oligomer or it can be added with the oligomer during the melt polymerization step. The recovery of the oligomer from the mixture can be achieved by stripping the organic solvent followed by recovery of the prepolymer from the aqueous mixture.

Suitable organic solvents which can be used during the interfacial polymerization making the prepolymer are chlorinated hydrocarbons, such as methylene chloride, chloroform, dichloroethylene, aromatic hydrocarbons, such as benzene, toluene, xylylene, ethylbenzene, cumine; ether solvents, such as diethylether, isobutylether, etc.

In preparing the prepolymer, it is preferred to add the organic diamine as an aqueous solution to an organic solvent solution of the organic dianhydride, while it is being agitated, such as being stirred, shaken, etc. However, effective results can be achieved if both solutions are contacted simultaneously, for example, in a common mixing vessel along with means for agitation.

Reaction between the organic dianhydride and the organic diamine can be effected under interfacial conditions at a temperature in the range of 0° C. to 100° C., and preferably 15° C. to 50° C. Depending upon such factors as the temperature, degree of agitation, nature of reactants, etc., time for the formation of the polymeramide acid can vary from 5 to 10 minutes or less to 1 to 2 hours or more.

Polyetherimide made in accordance with the practice of the present invention can be injection molded at substantially lower pressures and temperatures and the resulting thermoplastic exhibits extremely good mold release properties. In general, the molded samples have a smooth and glossy surface. In addition, the notched Izod impact strength of the resulting polyetherimide is substantially better as compared to polyetherimide free of such chain-stopping units while the other mechanical advanages of polyetherimide are substantially maintained. Although the unexpected results of the enhanced properties of the polyetherimide made in accordance with the present invention are not completely understood, one possible explanation is that the change in surface properties is affected based on the orientation of aliphatic end groups towards the surface. The change in surface characteristics is evidenced by the dramatic change in the contact angle of the polymer surface with water. The polyetherimide thermoplastics or prepolymer can be blended with various inert fillers such as various particulated fillers, for example, glass fibers, silica fillers, carbon whiskers, which can be utilized at up to 50% by weight of the resulting blend.

In order that those skilled in the art will be better able to practice the invention, the following examples are given by way of illustration and not by way of limitation. All parts are by weight.

EXAMPLE 1

A mixture of 182.04 parts of metaphenylene diamine, 903.25 parts of 2,2-bis[4-(3,4-dicarboxyphenoxy)-phenyl]propane dianhydride and 28.064 parts of n-octadecylamine was heated at 265° C. under argon. The mixture was vigorously stirred for 1.75 hours at 265° C. and thereafter extruded. There was obtained tough amber colored strands of polyetherimide based on method of preparation. The intrinsic viscosity of the resulting polymer in chloroform was 0.48 dl/g. A dynamic visco elastic measurement indicated that the zero shear viscosity of the polyetherimide was $2.9 \times 10^5$ poise at 300° C. Molded specimens of the polyetherimide had high quality glossy surfaces and excellent mold release properties. The improved mold release properties and glossy surface is in agreement with the low surface energy which can be shown by a high contact angle with water droplets. In order to further determine the unexpected properties of the polyetherimide made in accordance with the practice of the present invention, polyetherimide was made following the same procedure, except that phthalic anhydride was used as a chain stopping agent in place of the n-octadecyl amine. In preparing the phthalic anhydride melt polymerization mixture, there was utilized a mole ratio of 97 moles of organic dianhydride, 100 moles of meta-phenylene diamine and 6 moles of phthalic anhydride. As shown in Table I below, two polymers were prepared by melt polymerization with the octadecylamine as a chain-stopper utilizing a mole ratio of 98 moles of meta-phenylene diamine, 100 moles of organic dianhydride and 4 moles of the octadecylamine, while the second polymer contained a mole ratio of 98 moles of the meta-phenylenediamine, 100 moles of the organic dianhydride and 6 moles of the octadecylamine. The weight percent concentration of $C_{18}H_{37}$ end groups and the contact angle with water for the resulting polyetherimide are shown in Table 1.

TABLE I

| | Polymer | |
|---|---|---|
| Chain-stopper (mole %) | End Groups (WT %) ($C_{18}H_{37}$) | Contact Angle with $H_2O$ |
| Phthalic anhydride (6) | — | 27° |
| Octadecylamine (4) | 1.69 | 41° |
| Octadecylamine (6) | 2.51 | 82° |

The above results show that an increase in the concentration of —$C_{18}H_{37}$ end groups improves the surface characteristics of the resulting polyetherimide as shown by a high contact angle with water.

The following table shows a comparison between polyetherimide made by the above procedure utilizing mixtures having phthalic anhydride at a mole ratio of about 6 moles to 100 moles of the metaphenylenediamine and 97 moles of organic dianhydride with a melt polymerization product containing a mole ratio of 6 moles of octadecylamine with 100 moles of the organic dianhydride and 97 moles of metaphenylenediamine:

TABLE II

| Mechanical Properties | Polymer End Groups | |
|---|---|---|
| | Phthalic Anhydride | Octadecylamine |
| Tensile Strength (PSI) | | |
| at yield | 15,100 | 15,500 |
| at rupture | 13,000 | 12,400 |
| Elongation (%) | | |
| at yield | 7.8 | 7.4 |
| at rupture | 92 | 80 |
| Flexural strength (PSI) | | |
| at yield | 21,000 | 23,000 |
| Flexural Modulus (PSI) | 480,000 | 480,000 |
| Notched Izod Impact (ft.lb/m) | 1.0 | 1.4 |

The above results show that polyetherimide made with the above chain-stoppers are substantially the same, except that the octadecylamine shows a significant improvement in notched Izod Impact.

EXAMPLE 2

There was added 2.78 parts of octadecylamine over a period of about 10 minutes to a mixture while it was stirring under nitrogen at room temperature consisting of 89.65 parts of 2,2-bis[4-(3,4-dicarboxyphenoxy)phenyl]propane dianhydride and 468 parts of methylene chloride. There was then added to the resulting mixture over a period of 15 minutes, an aqueous solution which was formed under nitrogen with 500 parts of deaerated water and 18.069 parts of metaphenylenediamine. There was obtained a polyamideacid which precipitated to form a white slurry. The slurry was further stirred at room temperature for an additional 4.5 hours and then heated to distill the methylene chloride. The methylene chloride was completely removed in 1 hour and the temperature rose to 55° C. The resulting aqueous suspension of the polyamide acid was cooled to room temperature and filtered. The precipitate was washed with about 200 parts of water and dried. There was obtained a 95.6% yield or 105.6 parts of polyamideacid.

The above polyamideacid powder was placed in a vertical helicone mixer and heated with stirring at 270° C. for 2 hours under argon. The resulting polymer was found to be glossy and exhibited the substantially the same characteristics with respect to reduced melt viscosity and improved notched Izod Impact as shown with the polyetherimide of Example 1.

EXAMPLE 3

There was added 1.112 parts of dodecylamine over a period of five minutes to a stirred mixture of 51.046 parts of 4,4'-bis(3,4-dicarboxyphenoxy)diphenyl sulfide dianhydride, 250 parts of water and 300 parts of chloroform. There was then added 19.423 parts of finely pulverized 4,4'-oxydianiline over a period of 15 minutes. The resulting slurry of a prepolymer was stirred at room temperature for an additional 15 minutes and heated to reflux for 45 minutes. The chloroform was then allowed to distill off over a period of 40 minutes and cooled to room temperature. The prepolymer was filtered and dried. There was obtained 71.2 parts of product which, based on its method of preparation and its infrared spectrum was a polyetheramide acid.

Ther was placed 70 parts of the above oligomer in a Vertical Helicon Mixer and heated with stirring under an argon atmosphere at 280° C. for 2 hours. There was obtained an amber colored polyimide which had an intrinsic viscosity of 0.70 in m-cresol and glass transition temperature of 209° C.

Although the above examples are directed to only a few of the very many variables included within the method of the present invention, it should be understood that the present invention is directed to the use of a much broader variety of organic dianhydride of formula (1), organic diamine of formula (2) and chain stopper of formula (3).

What I claim as new and desire to secure by Letters Patent of the United States is:

1. Polyetherimides consisting essentially of chemically combined units of the formula,

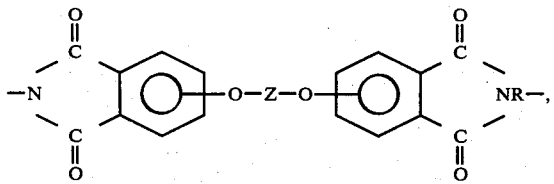

and terminal radicals of the formula, $-R^1$, where Z is a member selected from

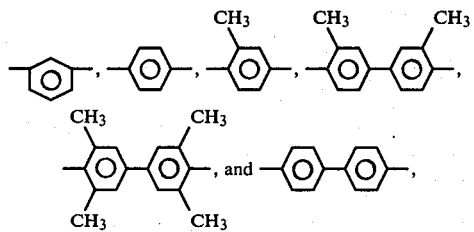

and divalent organic radicals of the general formula,

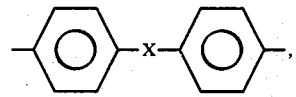

where X is a member selected from the class consisting of divalent radicals of the formula,

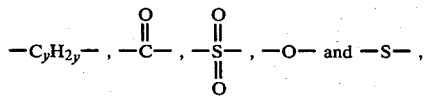

where y is an integer from 1 to 5, and R is a divalent organic radical selected from the class consisting of aromatic hydrocarbon radicals having from 6 to about 20 carbon atoms and halogenated derivatives thereof, alkylene radicals having from 2 to about 20 carbon atoms, cycloalkylene radicals having from 3 to about 20 carbon atoms, from $C_2$ to about $C_8$ alkylene terminated polydiorganosiloxane and divalent radicals of the formula,

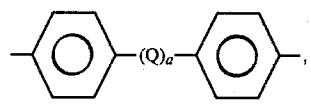

where Q is a member selected from —O—, —S—, —SO$_2$—, —CO— and —C$_x$H$_{2x}$—, x is an integer from 1 to 5, a is 0 or 1 and $R^1$ is an aliphatic radical having from 12–20 carbon atoms.

2. Polyetherimide in accordance with claim 1, where Z is p,p'-(2,2-diphenylpropane).

3. Polyetherimide in accordance with claim 1, where Z is p,p'-diphenylsulfide.

4. Polyetherimide in accordance with claim 1, where R is 1,3-phenylene.

5. Polyetherimide in accordance with claim 1, where R is p,p'-diphenylether.

6. Polyetherimide in accordance with claim 1, where $R^1$ is —$C_{18}H_{37}$.

7. Polyetherimide in accordance with claim 1, where $R^1$ is dodecyl.

8. A method for making polyetherimide which comprises melt polymerizing at a temperature in the range of from about 200° C. to about 400° C., a mixture of substantially equal molar amounts of organic dianhydride of the formula,

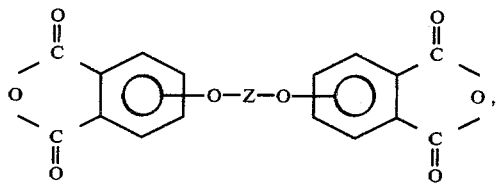

an organic diamine of the formula,

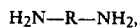

in the presence of an effective amount of aliphatic organic amine chain stopper of the formula,

where Z is a member selected from

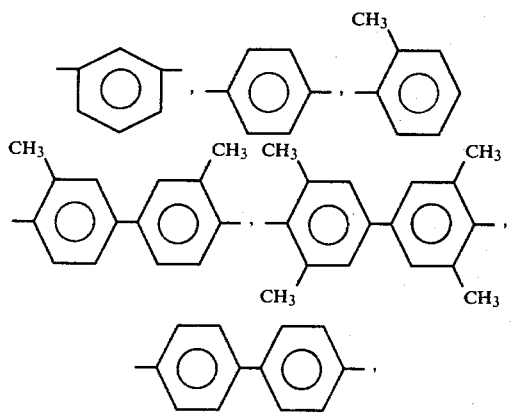

and divalent organic radicals of the general formula,

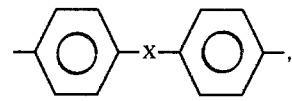

where X is a member selected from the class consisting of divalent radicals of the formula,

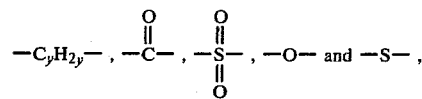

where y is an integer from 1 to 5, and R is a divalent organic radical selected from the class consisting of aromatic hydrocarbon radicals having from 6 to about 20 carbon atoms and halogenated derivatives thereof, alkylene radicals having from 2 to about 20 carbon atoms, cycloalkylene radicals having from 3 to about 20 carbon atoms, from $C_2$ to about $C_8$ alkylene terminated polydiorganosiloxane and divalent radicals of the formula,

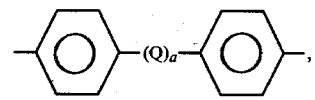

where Q is a member selected from —O—, —S—, —SO$_2$—, —CO— and —C$_x$H$_{2x}$—, x is an integer from 1 to 5, a is 0 or 1 and $R^1$ is an aliphatic radical having from 12–20 carbon atoms.

9. A method of making polyetherimide which comprises (1) interfacially reacting substantially equal molar amounts of organic dianhydride of the formula,

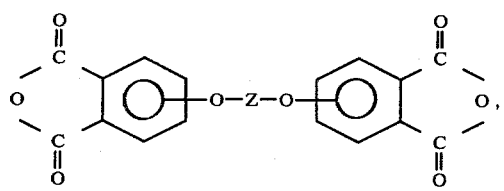

in an organic solvent and organic diamine of the formula,

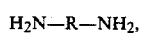

in water in the presence of an effective amount of aliphatic amine of the formula,

(2) effecting the removal of the organic solvent by evaporation from the resulting mixture of (1) and (3) recovering the resulting polyetherimide from the aqueous suspension of (2), where Z is a member selected from

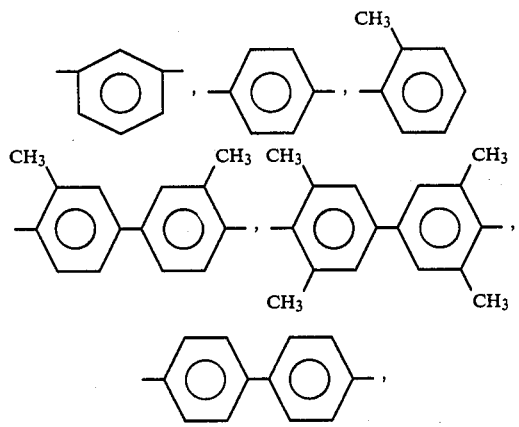

and divalent organic radicals of the general formula,

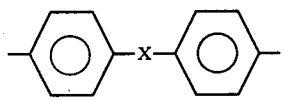

where X is a member selected from the class consisting of divalent radicals of the formula,

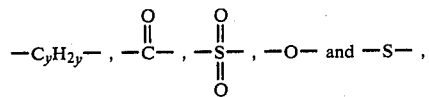

where $y$ is an integer from 1 to 5, and R is a divalent organic radical selected from the class consisting of aromatic hydrocarbon radicals having from 6 to about 20 carbon atoms and halogenated derivatives thereof, alkylene radicals having from 2 to about 20 carbon atoms, cycloalkylene radicals having from 3 to about 20 carbon atoms, from $C_2$ to about $C_8$ alkylene terminated polydiorganosiloxane and divalent radicals of the formula,

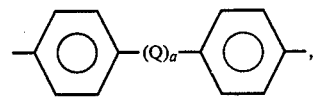

where Q is a member selected from —O—, —S—, —$SO_2$—, —CO— and —$C_xH_{2x}$—, $x$ is an integer from 1 to 5, $a$ is 0 or 1 and $R^1$ is an aliphatic radical having from 12–20 carbon atoms.

10. A method in accordance with claim 9, where the organic dianhydride is 2,2-bis[4-(3,4-dicarboxyphenoxy)phenyl]propane dianhydride.

* * * * *